United States Patent [19]

Inoue et al.

[11] 4,376,389

[45] Mar. 15, 1983

[54] METHOD OF DIAGNOSIS OF OPERATING CONDITIONS OF BEARING AND APPARATUS THEREFOR

[75] Inventors: Tomoaki Inoue; Kinpei Okano; Kazuo Ikeuchi; Tsuguaki Koga, all of Hitachi, Japan

[73] Assignee: Hitachi, Ltd., Tokyo, Japan

[21] Appl. No.: 210,171

[22] Filed: Nov. 25, 1980

[30] Foreign Application Priority Data

Nov. 26, 1979 [JP] Japan .................................. 54-152093

[51] Int. Cl.³ .......................................... G01M 13/04
[52] U.S. Cl. .................................................. 73/118
[58] Field of Search ............................. 73/118, 10, 64; 364/508, 558

[56] References Cited

U.S. PATENT DOCUMENTS

| 2,017,425 | 10/1935 | Wheeler | 73/10 X |
| 3,952,566 | 4/1976 | Jacobson | 73/10 |
| 4,118,933 | 10/1978 | Coleman et al. | 73/766 |

Primary Examiner—Jerry W. Myracle
Attorney, Agent, or Firm—Antonelli, Terry & Wands

[57] ABSTRACT

A method of and an apparatus for diagnosis of the operating conditions of a bearing wherein pressures of a film of oil formed on a sliding surface of the bearing journalling a rotary shaft are detected at a plurality of points on the sliding surface, and the pressure differential between the pressures of the oil film detected at the plurality of points is calculated. The deflection of the bearing with respect to the rotary shaft is calculated based on the calculated oil pressure film pressure differential, so that the operating conditions of the bearing are judged based on the deflection thereof.

21 Claims, 11 Drawing Figures

METHOD OF DIAGNOSIS OF OPERATING CONDITIONS OF BEARING AND APPARATUS THEREFOR

BACKGROUND OF THE INVENTION

This invention relates to bearings of steam turbines and other rotary machines of a large size, and more particularly it is concerned with a method of diagnosis of the operating conditions of a bearing and an apparatus therefor capable of making accurate diagnosis of the operating conditions of the bearing.

As is well known, a rotary machine of a large size, such as a steam turbine, includes a multispan shaft system rotatably supported by a series of journal bearings. In a rotary machine of the type described, the static flexure of the shaft becomes not negligible when the rigidity of the shaft is lowered. At the same time, the shaft tends to develop unstable vibration, such as an oil whipping, because the shaft operates in a range of rotational velocities over twice the primary critical velocity. To avoid such unstable vibration, it is the present practice to increase the surface pressure of the bearings. Thus, in a multispan shaft system, the upper limit of the load on the bearings with respect to seizure and the lower limit of the load on them with respect to unstable vibration are measured, and alignment is set for each bearing in such a manner that the load applied thereto is within the aforesaid range of tolerances. As a result, the line connecting together the centers of the bearings is not straight, and the centers of the bearings have heights which may vary depending on the amount of static flexure due to a variation in the rigidity of the shaft. In this case, each bearing is deflected to conform to the deflection of the shaft.

Thus it is essential that the operating conditions of each bearing be placed under surveillance to determine whether or not the bearing follows up any change which might occur in the shaft. Particularly in a large rotary machine in which reliability of performance is an important factor, it is essential that the operating conditions of each bearing be accurately sensed and indicated.

U.S. Pat. No. 4,118,933 is a prior art reference directed to a bearing load indicator which functions to sense, indicate and/or record loading on a bearing. This prior art reference uses strain gauges disposed on the bearing support yoke for detecting the load on the bearing based on changes in the resistance of the strain gauges.

SUMMARY OF THE INVENTION

An object of the present invention is to enable a correct diagnosis of the operating conditions of a bearing to be made.

Another object is to enable a correct diagnosis of the operating conditions of a bearing to be made based on detected values representing the conditions of the bearing indicative of the behavior thereof.

According to the invention, there is provided a method of diagnosis of the operating conditions of a bearing comprising the steps of detecting the value of at least one of several conditions indicative of the behavior of a bearing journalling a rotary shaft, and determining the operating conditions of the bearing based on the detected value of the condition.

According to the invention, there is also provided an apparatus for diagnosis of the operating conditions of a bearing comprising detecting means for detecting the value of at least one of several conditions indicative of the behavior of the bearing journalling a rotary shaft, and an arithmetic unit for determining the operating conditions of the bearing based on the value of the condition detected by the detecting means.

DESCRIPTION OF THE PREFERRED EMBODIMENT

Figure 1:
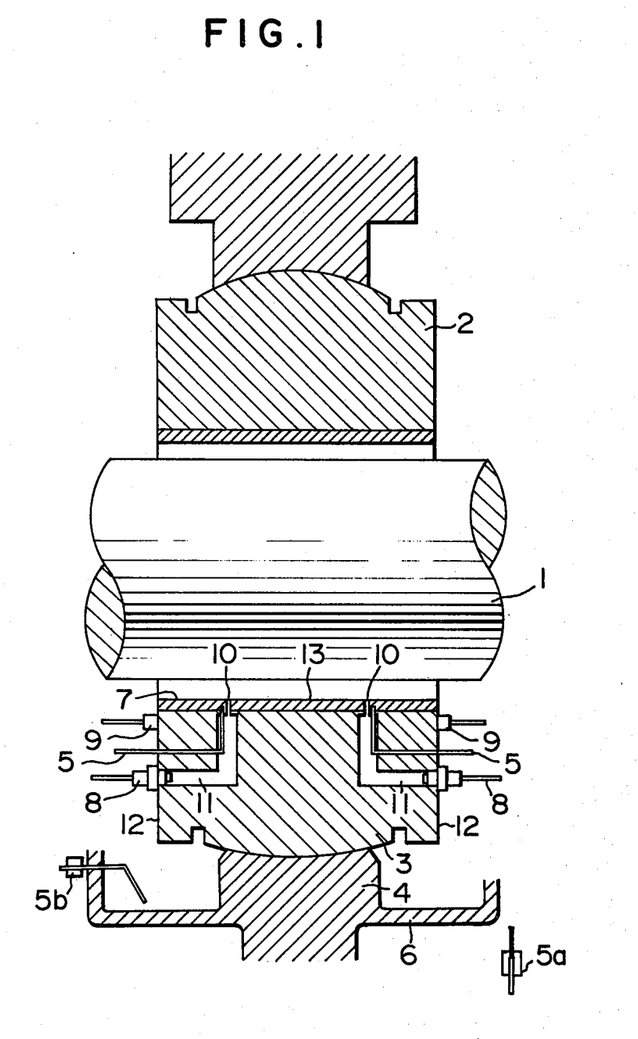
FIG. 1 is a sectional view of a bearing assembly of a steam turbine incorporating therein part of the apparatus for diagnosis of the operating conditions of a bearing comprising one embodiment of the invention.

A preferred embodiment of the invention will now be described by referring to the accompanying drawings. FIG. 1 shows the manner in which detectors constituting part of the apparatus for diagnosis of the operating conditions of a bearing according to the invention are mounted on the bearing. In FIG. 1, a bearing assembly for journalling a rotary shaft 1 comprises an upper bearing half section 2, a lower bearing half section 3, a bearing support 4 for supporting the lower bearing half section 3, and a cover member 6. The lower bearing half section 3 is formed at a sliding surface 7 thereof with pressure measuring apertures 10 of a diameter of about 2 mm at least in two positions circumferentially spaced apart from each other and at least in two positions axially spaced apart from each other or at least in four positions in total, the pressure measuring apetures 10 being connected to pressure transferring ducts 11 formed in the lower bearing half section 3 in the form of a letter L in cross section and terminating at opposite end faces 12 of the lower bearing half section 3. A pressure measuring element 8 is mounted on each of the opposite end faces 12 at the end of each pressure transferring ducts 11. A heat sensitive element 5 which may be a thermocouple is embedded in a bearing surface layer 13 close to each of the pressure measuring apertures 10. A sound detecting element 9 is mounted on each of the opposite end faces 12 of the lower bearing half section 3. A heat sensitive element 5a is mounted on a lubricant supply system for the bearing assembly for measuring the temperature of the lubricant fed to the bearing assembly. A heat sensitive element 5b is mounted on the cover member 6 for measuring the temperature of the lubricant discharged from the bearing assembly.

Figure 2:
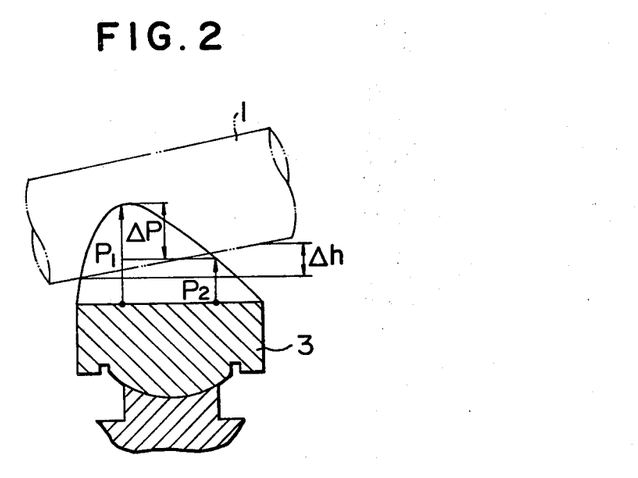
FIG. 2 is a schematic view showing the relation between the end bearing and the pressure of an oil film in a bearing.

The measuring elements described hereinabove are used for sensing and indicating the operating conditions of the bearing assembly. It is the pressure of an oil film formed by the lubricant between the bearing surface layer 13 and the rotary shaft 1 that gives the most detailed information on the operating conditions of the bearing. FIG. 2 shows the deflection of the bearing in relation to the pressures of an oil film measured at two points symmetrically disposed on the surface of the bearing. When the shaft 1 and the lower bearing half section 3 are inclined relative to each other as shown in FIG. 2, a pressure differential $\Delta p$ between pressures $p_1$ and $p_2$ of the oil film measured at two points symmetrically disposed axially of the bearing will increase as a deflection $\Delta h$ of the bearing with respect to the shaft becomes greater. Conversely, by watching the pressure differential $\Delta p$, it is possible to obtain information on the deflection of the bearing with respect to the shaft.

Figure 3:
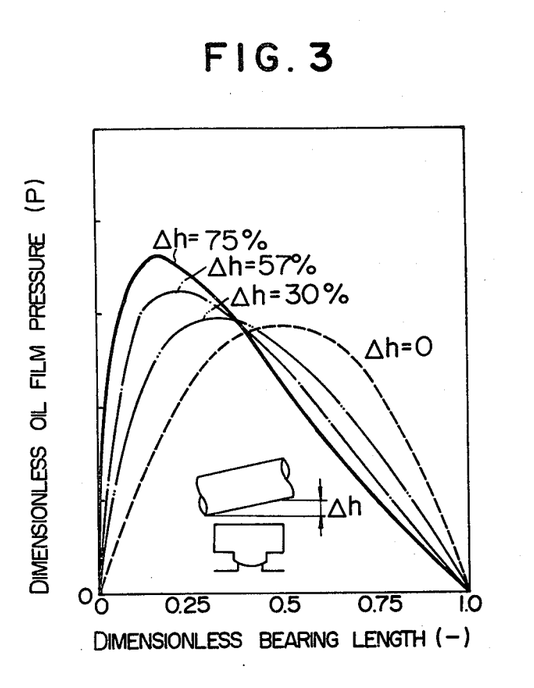
FIG. 3 is a diagram showing the distribution of the pressures of an oil film on a bearing in the condition of end bearing.
Figure 4:
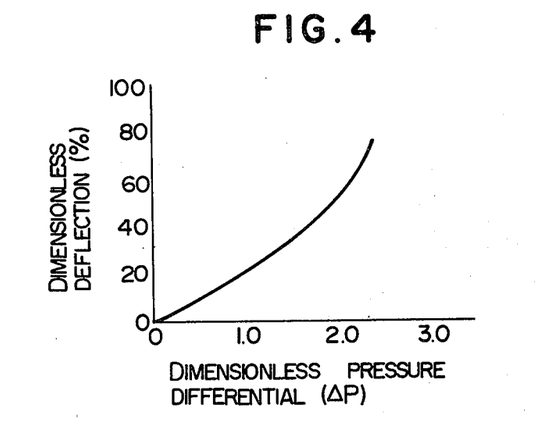
FIG. 4 is a diagram showing the amount of deflection of a bearing in relation to the pressure differential of an oil film.
Figure 5:
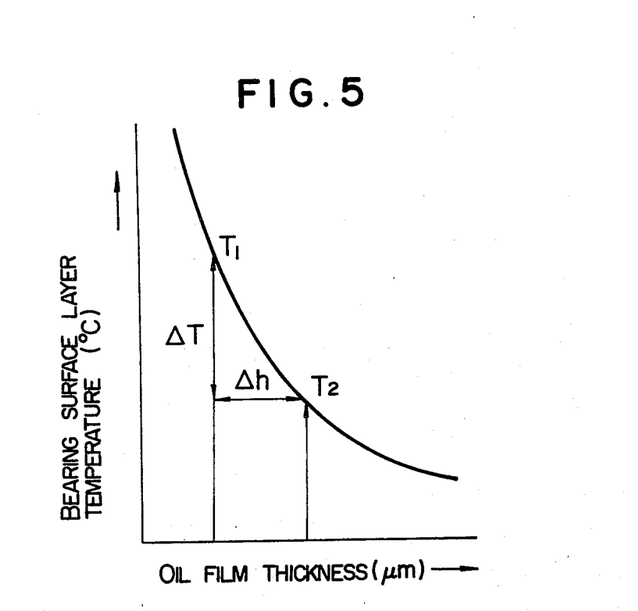
FIG. 5 is a diagram showing the relation between the thickness of an oil film and the temperature of the surface layer of a bearing.

FIG. 3 is a diagram showing the distribution of the pressures of an oil film on a bearing of a diameter of 406 mm rotating at 3000 rpm in the condition of end bearing. It will be seen that as the amount of end bearing $\Delta h$ increases, the distribution of the pressures of the oil film shows changes. FIG. 4 shows the relation between a dimensionless pressure differential $\Delta p$ and a dimensionless deflection $\Delta h$ obtained in FIG. 3. In the figure, the relation between $\Delta p$ and $\Delta h$ can be expressed by the following equation:

$$h = [a_1\Delta p + a_2\Delta p^2 + a_3\Delta p^3 + a_4\Delta p^4]N^\alpha(L/D)^\beta \ldots \quad (1)$$

where
$a_1$–$a_4$: coefficients.
$\alpha, \beta$: coefficients.
N: the rpm of the shaft.
L: the length of the bearing.
D: the diameter of the bearing.

Thus it is possible to obtain information on the end bearing condition of the bearing by measuring the pressure differential $\Delta p$. FIG. 3 shows the distribution of the pressures of an oil film on a bearing in a condition of axially directed end bearing. In actual practice, end bearing occurs not only axially but also horizontally. That is, horizontally directed end bearing directed circumferentially of the sliding surface of the bearing may occur due to miscoupling, for example. Also, a combination of axially directed end bearing and horizontally directed end bearing could occur. Thus at least four spots are selected in the invention for measuring the pressures of the oil film on the bearing at least at two axially spaced-apart points and at two circumferentially spaced-apart points, to find out the direction of end bearing.

As described hereinabove, the pressures of the oil film are measured by at least four pressure measuring elements 8 to obtain accurate information on the condition of end bearing of the bearing based on the pressure differential $\Delta p$. However, no sensing system could detect mulfunctions of a bearing merely based on the detected values of the pressure of an oil film formed on the bearing. In a large rotary machine such as a steam turbine, it is not too much to say that the end bearing of a slight degree occurs at all times. However, no mulfunctions could exist if the bearing moves in sliding movement without any trouble and no damages are caused on the bearing surface, even if there is slight end bearing. On the other hand, the majority of cases of burnout of bearings are accounted for by melting of white metal constituting the bearing surface layer 13 due to a rise in temperature. More specifically, white metal which has a softening temperature of about 130° C. has been found to have a maximum temperature of over 100° C. when a bearing of a diameter D of 483 mm and a length L of 250 mm rotating at a number of revolutions N of 2000 rpm has a deflection of $\Delta h = 14\%$. It will be seen that a slight degree of end bearing contributes greatly to the burnout of a bearing. Thus according to the invention, measurements of the temperature of the bearing metal may be combined with measurements of the pressure of the oil film to ensure that the accuracy of the information on mulfunctions of the bearing can be increased. To this end, the heat sensitive elements 5 are disposed close to the sliding surface 7 of the bearing so as to enable a sensing system of high responsiveness to be obtained for obtaining the results of sensing in a short period of time. The heat sensitive elements 5 of this embodiment are disposed in the same positions as the oil film pressure measuring apertures 10, so that it is possible to determine the amount and direction of end bearing by measuring a temperature differential $\Delta T$ of the bearing surface layer 13 in the same manner as measuring the oil film pressure differential $\Delta p$. Thus measurements of the oil film pressure and the temperature of the bearing surface layer give information of increased accuracy on the operating conditions of the bearing. In view of the thickness of the oil film, the oil film pressure measuring elements 8 and the heat sensitive elements 5 are usually disposed substantially in the middle of the lower bearing half section 3 peripherally thereof. Misalignment of the bearing assembly which might be caused by changes with year of the bearing support would damage the upper bearing half section 2. By taking such situation into consideration, the sound detecting elements 9 for detecting abnormal sounds which would be produced as the bearing assembly is brought into contact with the shaft 1 may be mounted according to the invention in addition to the oil film pressure measuring elements 8 and the heat sensitive elements 5 described hereinabove, so as to further increase the accuracy with which mulfunctions of the bearing can be detected.

Figure 6:
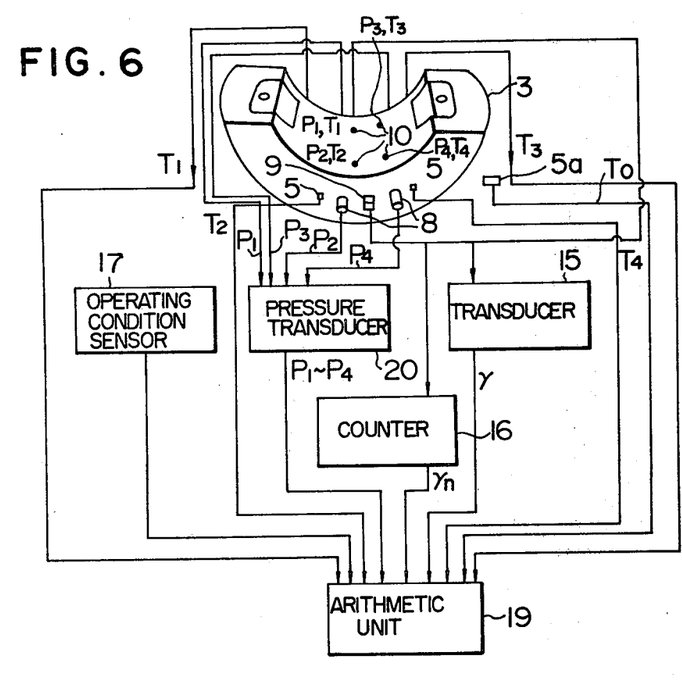
FIG. 6 is a schematic view of the apparatus for diagnosis of the operating conditions of a bearing comprising one embodiment of the invention.

FIG. 6 is a schematic view of the apparatus for diagnosis of the operating conditions of a bearing comprising one embodiment of the invention. The pressure measuring elements 8 mounted in four pressure measuring apertures 10 generate oil film pressure signals $p_1$–$p_4$ supplied to an arithmetic unit 19 via a pressure transducer 20. The four heat sensitive elements 5 generate bearing surface layer temperature signals $T_1$–$T_4$ supplied to the arithmetic unit 19. Signals from the sound detecting elements 9 are converted by a transducer 15 into sound signal energy value signals $\gamma$ and by a counter 16 into sound signal generation frequency signals $\gamma_n$, the signals $\gamma$ and $\gamma_n$ being supplied to the arithmetic unit 19.

Meanwhile the load on the turbine, the number of revolutions of the turbine and ON-OFF signals of the oil lifter are supplied from an operating condition sensor 17 to the arithmetic unit 19, and a fed oil temperature signal $T_0$ is supplied from the heat sensitive element 5a to the arithmetic unit 19. The arithmetic unit 19 performs operations on the data supplied thereto in this way, so as to diagnose the operating conditions of the bearing by sensing any abnormality therein.

Figure 7:
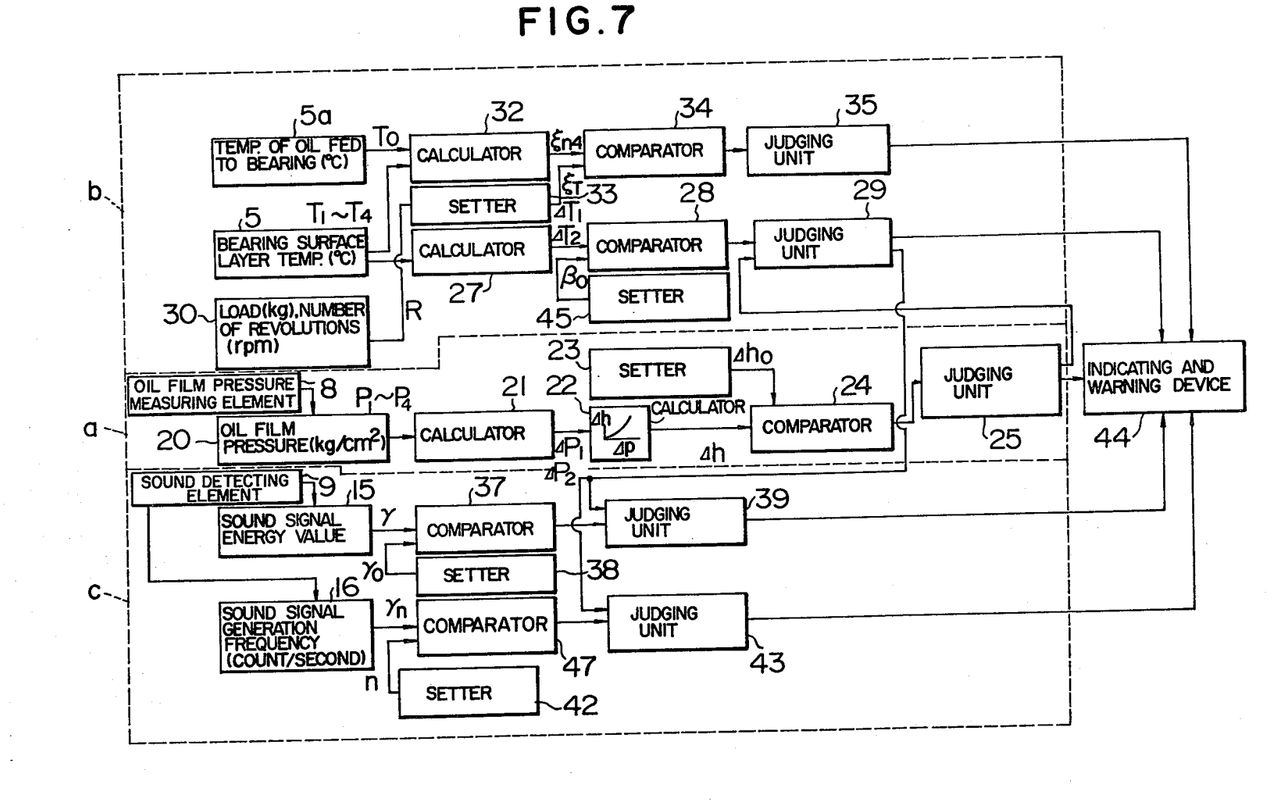
FIG. 7 is a block diagram showing in detail the diagnozing apparatus shown in FIG. 6.

FIG. 7 is a block diagram of the apparatus for diagnosis of the operating conditions of a bearing shown in FIG. 6. An oil film pressure calculating circuit a will be first described. Signals from the oil film pressure measuring elements 8, which are four in number including two elements disposed peripherally and two elements disposed axially, are converted by the pressure transducer 20 into oil film pressure values $p_1-p_4$ which are supplied to a calculator 21 where the axial pressure differentials $\Delta p_1 = p_1 - p_2$, $\Delta p_2 = p_3 - p_4$ of the oil film pressure signals are calculated. The axial pressure differentials $\Delta p_1$, $\Delta p_2$ obtained in this way are supplied to a calculator 22 where the deflection $\Delta h$ is calculated by equation (1) from the relation between the pressure differential $\Delta p$ and the deflection $\Delta h$ as shown in FIG. 2. A setter 23 is provided for setting a reference value $\Delta h_0$ depending on the operating conditions, and the deflection $\Delta h$ obtained by calculation is compared with the reference value $\Delta h_0$ at a comparator 24. The result of the comparison is supplied to a judging unit 25. When $\Delta h > \Delta h_0$, the judging unit 25 judges that the end bearing has malfunction of degree 1. The result of the judgement by the judging unit 25 is indicated by an indicating and warning device 44, and at the same time supplied to a bearing surface layer temperature judging circuit b when the bearing has been found to be malfunctioning, so that the result of the judgement by the judging unit 25 is compared with the result of the judgment on the bearing surface layer temperature.

A bearing surface layer temperature judging circuit b will now be described. The temperature signals $T_1 \sim T_4$ from the heat sensitive elements 5 (four in number) indicating the temperatures of the bearing surface layer 13 are compared with the fed oil temperature signal $T_0$ from the heat sensitive element 5a at a calculator 32 where rises in temperature $\xi_1 \sim \xi_4 = T_1 \sim T_4 - T_0$ are calculated. The rises in temperature $\xi_1 \sim \xi_4$ obtained in this way are compared at a comparator 34 with a reference value signal $\xi_T$ set by a setter 33 in accordance with the number of revolutions R and other factors which are turbine operation condition values. The result of the comparison is judged by a judging unit 35. When $\xi_1 \sim \xi_4 < \xi_T$, the judging unit 35 judges that the temperature is abnormal, and the result is indicated by the indicating and warning device 44. Meanwhile the signals $T_1 \sim T_4$ indicating the temperatures of the bearing surface layer are supplied to a calculator 27 where axial temperature differentials $\Delta T_1 = T_1 - T_2$, $\Delta T_2 = T_3 - T_4$ are calculated. The axial temperature differentials thus calculated are compared at a comparator 28 with a reference value $\beta_0$ from a setter 45 for the temperature differentials $\Delta T_1$, $\Delta T_2$, and the result of the comparison is supplied to a judging unit 29. The judging unit 29 judges whether the temperature differentials $\Delta T_1$, $\Delta T_2$ show any abnormality, and compares them with the result of the judgement by the judging unit 25 of the pressure judging circuit described hereinabove. When the bearing is judged to have abnormality by the oil film pressure judging circuit a but judged by to have no abnormality or to be short abnormality by the bearing surface layer temperature judging circuit b, misoperation of the sensors is judged to be responsible for the results. However, when both the oil film pressure judging circuit a and the bearing surface layer temperature judging circuit b judge that abnormality is present in the bearing, then the bearing is judged to have malfunction degree II, and the indicating and warning device 44 gives an indication of bearing malfunction.

By measuring the pressures of the oil film and the temperatures of the bearing surface layer as described hereinabove, it is possible to determine whether or not the measuring elements are normally functioning.

When the bearing surface layer temperature judging circuit b judges that abnormality is present, the judgment is supplied to a sound signal circuit c where the judgment passed by the bearing surface layer temperature judging circuit b is compared with the sound signals detected.

Figure 8:
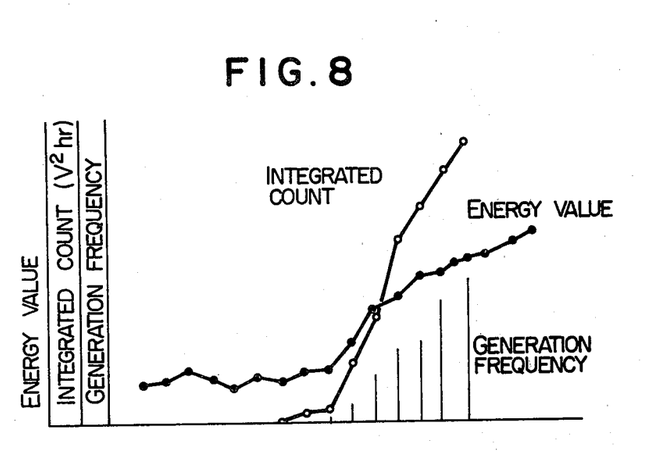
FIG. 8 is a diagram showing a sound signal detected by the sound detector.

The sound signal circuit c will be described. Sound signals from the sound measuring elements 9 are each composed, as shown in FIGS. 7 and 8, of a sound signal energy value $\gamma$ and a sound signal generation frequency $\gamma_o$. Setters 38 and 42 set reference values $\gamma_o$ and n for the energy value $\gamma$ and the generation frequency $\gamma_n$ respectively, and the energy value $\gamma$ and generation frequency $\gamma_n$ are compared with the reference values $\gamma_o$ and n at comparators 37 and 41 respectively. The results of the comparison are supplied to judging circuits 39 and 41 where the bearing is judged as to whether there is any abnormality based on the sound signal values $\gamma$ and $\gamma_n$. When any abnormality is found to be present in the bearing based on the sound signal judgment, the magnitude of the abnormality is determined by comparing the result of the judgment passed by the sound signal circuit c with the result of the judgment passed by the bearing surface layer temperature judging circuit b.

When the bearing is judged by the bearing surface layer temperature judging circuit b as having malfunction but no abnormality is found by the sound signal circuit c, the bearing is judged as having malfunction degree II in which the bearing is greatly deflected with respect to the shaft but there is no contact therebetween. However, when the bearing is judged to have abnormality based on the judgment of the sound signal circuit c in addition to the judgment of abnormality passed by the bearing surface layer temperature judging circuit b, then the bearing is judged to have malfunction degree III in which the bearing is in contact with the shaft and the bearing surface layer has developed seizure.

When the three types of measuring elements or the oil film pressure measuring elements, bearing surface layer temperature measuring elements and the sound measuring elements are used in combination as aforesaid, it is possible to make diagnosis of not only the conditions but also the degree of end bearing of the bearing, so as to give accurate information on the operating conditions of the bearing.

Figure 9:
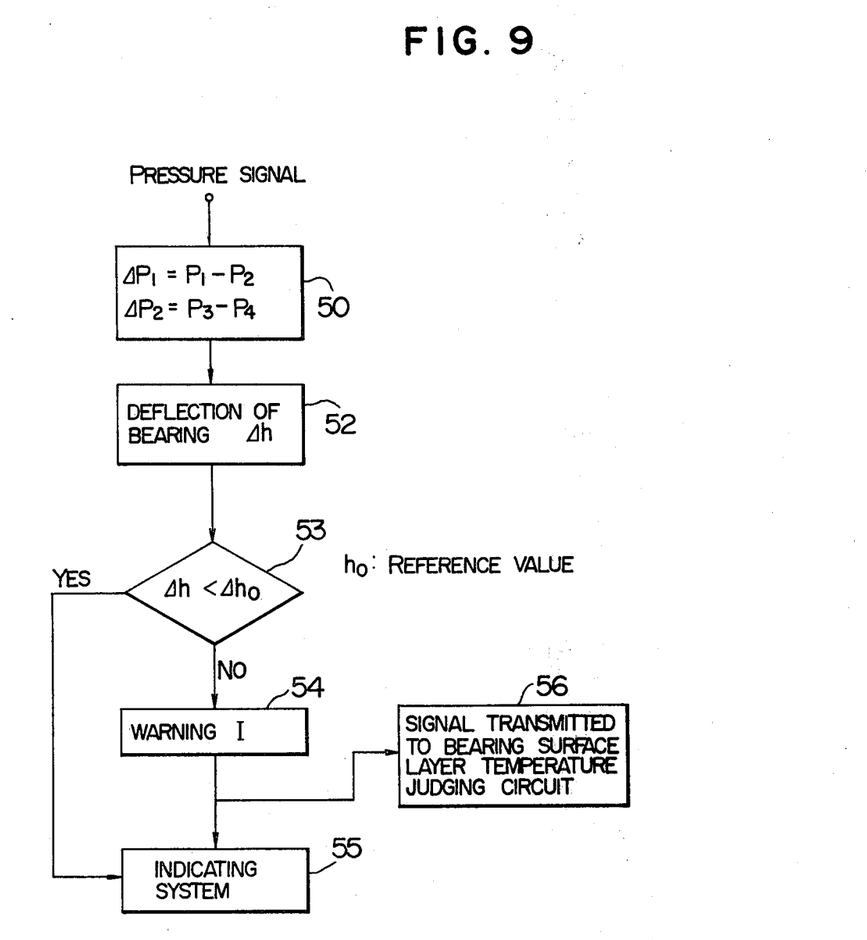
FIGS. 9-11 are flow charts showing the calculations done in various sections of the block diagram shown in FIG. 7.
Figure 10:
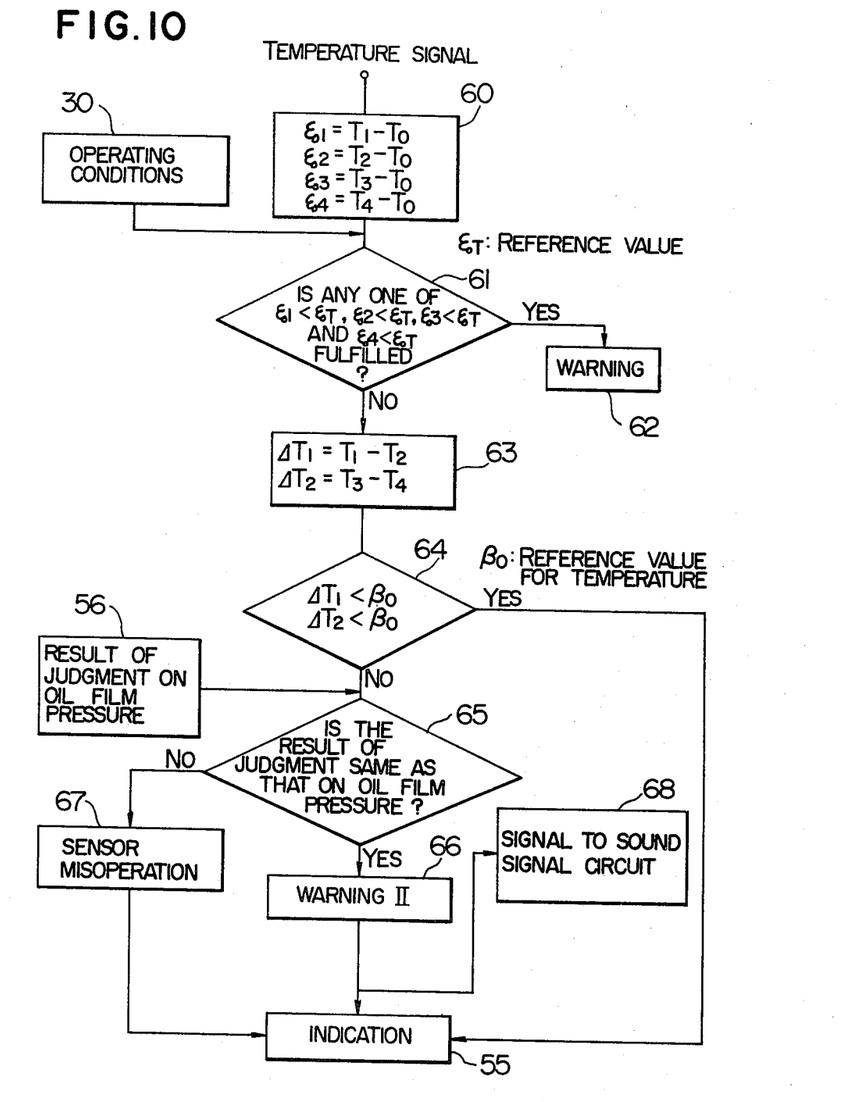
Figure 11:
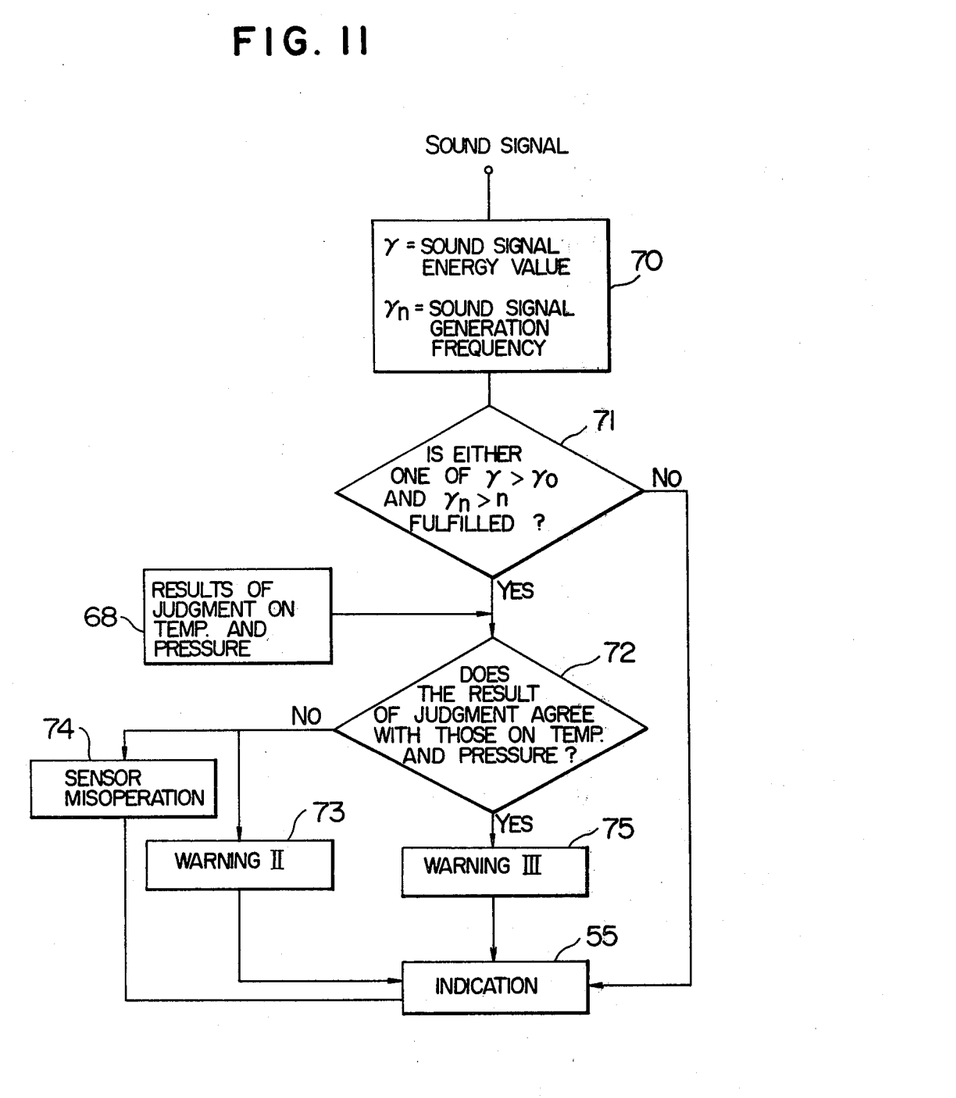

FIGS. 9-11 are flow charts showing the process in which calculation is done and judgement is passed in the oil film pressure judging circuit a, bearing surface layer temperature judging circuit b and sound signal circuit c respectively. In FIG. 9, axial pressure differentials $\Delta p_1 = p_1 - p_2$ and $\Delta p_2 = p_3 - p_4$ are calculated from the values $p_1 \sim p_4$ of the measured pressures of the oil film as indicated at 50. It is for the purpose of judging the direction of deflection of the bearing that the pressure differentials are measured at the two points $\Delta p_1$ and $\Delta p_2$. When the pressure differentials are greater than the reference value, a deflection $\Delta h$ is calculated from equation (1) as indicated at 52, and the deflection $\Delta h$ is compared with the reference value $\Delta h_o$ as indicated at 53. When the deflection $\Delta h$ is smaller than the reference value $\Delta h_o$, a slight deflection but no abnormality is indicated. However, when the deflection Δh is greater than the reference value Δh$_o$, then the bearing is judged to have malfunction degree I, and a warning is given as indicated at 54 and at the same time the judgment passed by the pressure circuit a is transmitted to the bearing surface layer temperature judging circuit b as indicated at 56. The judgment is also indicated by an indicating system as shown at 55.

FIG. 10 is a flow chart showing the process in which calculation is done and judgement is passed in the bearing surface layer temperature judging circuit b. The bearing surface layer temperature signals T$_1$~T$_4$ are compared with the fed oil temperature signal T$_o$ and rises in temperature ξ$_1$~ξ$_4$=T$_1$~T$_4$−T$_o$ are calculated as indicated at 60. The rises in temperature ξ$_1$~ξ$_4$ are compared with the reference value ξ$_T$ as indicated at 61. When any one of the rises in temperature ξ$_1$~ξ$_4$ is larger than the reference value ξ$_T$, abnormality is indicated as indicated at 62. Then, as indicated at 63, temperature differentials ΔT$_1$=T$_1$−T$_2$, ΔT$_2$=T$_3$−T$_4$ are calculated from the bearing surface layer temperature signals T$_1$~T$_4$. As indicated at 64, the temperature differentials ΔT$_1$, and ΔT$_2$ are compared with the reference value β$_o$ for the end bearing. When the temperature differentials are smaller than the reference value β$_o$, no abnormality is found and the judgment is transmitted to the indicating system as indicated at 55. However, when the temperature differentials are greater than the reference value β$_o$, abnormality is judged and the judgment is compared with the judgment passed by the oil film pressure judging circuit a as indicated at 65. When the judgments passed by the two circuits a and b both indicate abnormality, the bearing is judged to have malfunction degree II and indication thereof is given as shown at 55 by the indicating system. When the judgments passed by the two circuits a and b are distinct from each other, then the sensor is judged to be misoperating as indicated at 67, and the indicating system gives an indication of sensor misoperation. When the bearing metal surface layer temperature judging circuit b gives judgment of abnormality, the judgment is transmitted to the sound signal circuit c as indicated at 68.

FIG. 11 is a flow chart showing the process in which calculation is done and judgment is passed in the sound signal circuit c. A sound signal is converted into the sound energy value γ and the generation frequency γ$_n$ as indicated at 70, which are then compared with the reference values γ$_o$ and n respectively as indicated at 71. When the detected values are larger than the reference values or γ>γ$_o$ and γ$_n$>n, the judgment passed by the sound signal circuit c is compared with the judgments passed by the oil film pressure judging circuit a and bearing surface layer temperature judging circuit b as indicated at 72. When the former agrees with the latter, the bearing is judged to have malfunction degree III as indicated at 75 and a warning is issued. When the former does not agree with the latter, an indication of bearing malfunction degree of II indicated at 73 or an indication of sensor misoperation indicated at 74 is given as the case may be.

From the foregoing description, it will be appreciated that according to the embodiment of the invention shown and described hereinabove, it is possible to obtain information on the operation conditions of a bearing at least based on the pressures of the oil film on the bearing. That is, malfunctions of the bearing, such as deflection of the bearing and the end bearing thereof, can be detected by measuring the oil film pressures and comparing them with reference values. Also, malfunctions of the bearing can be detected based on the differences between the bearing surface layer temperatures and the fed oil temperature and the differences in bearing surface layer temperature between a plurality of points on the bearing surface layer. Also, malfunctions of the bearing, such as end bearing, can be detected based on the sound signal obtained from the bearing. Thus the invention enables the operating conditions of the bearing to be diagnosed based on the values of conditions of the bearing. Since the invention enables malfunctions of the bearing to be detected based on the values of conditions for operation of the bearing, such as oil film pressures, bearing surface layer temperatures and sounds generated by the bearing, it is possible to prevent occurrence of a serious accident.

What is claimed is:

1. A method of diagnosis comprising the steps of:
    detecting values representing the conditions of the bearing indicative of the behavior of the bearing journalling a rotary shaft, including detecting pressures of an oil film formed by lubricant on a sliding surface of the bearing at a plurality of points on the sliding surface as values representing one condition of the bearing;
    diagnosing at least one of the operating conditions of the bearing and abnormality in the bearing based on the detected values of the conditions of the bearing including calculating the pressure differentials between the plurality of values of oil film pressures detected at the plurality of points; and calculating the deflection of the bearing with respect to the rotary shaft based on the calculated oil film pressure differentials, to thereby diagnose the operating conditions of the bearing.

2. A method of diagnosis as set forth in claim 1, comprising the steps of: calculating the oil film pressure differentials axially of the rotary shaft based on the oil film pressures detected at a plurality of points on the sliding surface of the bearing spaced apart from one another a certain distance axially of the rotary shaft; and calculating the deflection of the bearing with respect to the rotary shaft axially of the rotary shaft based on the calculated oil film pressure differentials.

3. A method of diagnosis as set forth in claim 1, comprising the steps of: calculating the oil film pressure differentials circumferentially of the sliding surface of the bearing at a plurality of points spaced apart from one another a certain distance circumferentially of the bearing sliding surface; and calculating the deflection of the bearing with respect to the rotary shaft circumferentially of the bearing sliding surface based on the calculated oil film pressure differentials.

4. A method of diagnosis as set forth in claim 1, comprising the step of: comparing the calculated oil film pressure differentials with reference values of pressure set beforehand, so as to judge abnormality in the bearing caused by the deflection of the bearing with respect to the rotary shaft.

5. A method of diagnosis as set forth in claim 1, comprising the steps of: detecting the temperature of a bearing surface layer and the temperature of the lubricant fed to the bearing as values representing another condition of the bearing; calculating the temperature differentials between the detected bearing surface layer temperatures and the detected temperature of the lubricant fed to the sliding surface of the bearing; and judging abnormality in the bearing based on the detected deflection of the bearing and the calculated temperature differentials.

6. A method of diagnosis as set forth in claim 1, comprising the steps of: detecting signal sound values in the bearing as values representing another condition of the bearing; and judging abnormality in the bearing based on the detected deflection of the bearing and the detected sound signal values.

7. A method of diagnosis of a bearing, comprising the steps of:
detecting values representing the conditions of the bearing indicative of the behavior of the bearing journalling a rotary shaft including detecting the bearing surface layer temperatures in the vicinity of the sliding surface of the bearing and the temperature of the lubricant fed to the sliding surface of the bearing as values representing one condition of the bearing;
diagnosing at least one of the operating conditions of the bearing and abnormality in the bearing based on the detected values of the conditions of the bearing including calculating the temperature differentials between the detected bearing surface layer temperatures and the detected temperature of the lubricant fed to the sliding surface of the bearing; and diagnosing the operating conditions of the bearing based on the calculated temperature differentials.

8. A method of diagnosis as set forth in claim 7, comprising the step of diagnosing abnormality in the bearing by comparing the calculated temperature differential with a reference value of temperature set beforehand.

9. A method of diagnosis as set forth in claim 7, comprising the steps of: calculating the temperature differentials between the temperatures of bearing surface layer detected at a plurality of points spaced apart from one another a certain distance; and diagnosing abnormality in the bearing based on the calculated temperature differentials of the bearing surface layer.

10. A method of diagnosis of a bearing, comprising the steps of:
detecting values representing the conditions of the bearing indicative of the behavior of the bearing journalling a rotary shaft including detecting sound signal values from the bearing as values representing one condition of the bearing;
diagnosing at least one of the operating conditions of the bearing and abnormality in the bearing based on the detected values of the conditions of the bearing including diagnosing the operating conditions of the bearing based on the detected sound signal values.

11. A method of diagnosis as set forth in claim 10, comprising the step of comparing the detected sound signal values with reference value of sound set beforehand, to judge abnormality in the bearing.

12. A method of diagnosis as set forth in claim 10, wherein said sound signal values comprise sound energy values.

13. A method of diagnosis as set forth in claim 10, wherein said sound signal values comprise sound signal generation frequencies higher than a reference level.

14. An apparatus for diagnosis of a bearing comprising:
means for detecting values representing the conditions of the bearing indicative of the behavior of the bearing journalling a rotary shaft, said means for detecting values representing the conditions of the bearing including pressure detecting means for detecting the pressures of an oil film formed by lubricant on a sliding surface of the bearing;
arithmetic means for diagnosing the operating conditions of the bearing based on the values representing the conditions of the bearing detected by said detecting means, said arithmetic means including a first calculating unit for calculating the oil film pressure differentials between oil film pressure signals produced by said pressure detecting means at a plurality of points on said sliding surface of the bearing, a second calculating unit for calculating the deflection of the bearing with respect to the rotary shaft based on the oil film pressure differentials calculated by said first calculating unit, and a first judging unit for diagnosing the operating conditions of the bearing based on the deflection of the bearing calculated by said second calculating unit.

15. A diagnosing apparatus as set forth in claim 14, wherein said pressure detecting means are located at least at two points spaced apart from each other axially of the rotary shaft so as to calculate the oil film pressure differential axially of the rotary shaft by said first calculating unit.

16. A diagnosing apparatus as set forth in claim 14, wherein said pressure detecting means are located at least at two points spaced apart from each other axially of the rotary shaft and at least at two points spaced apart from each other circumferentially of the sliding surface of the bearing, and said first calculating unit calculates the oil film pressure differentials both axially of the rotary shaft and circumferentially of the sliding surface of the bearing.

17. A diagnosing apparatus as set forth in claim 14, wherein said means for detecting values representing the conditions of the bearing further comprises bearing surface layer temperature detecting means located in the vicinity of the sliding surface of the bearing for detecting the temperatures of the bearing surface layer, and fed oil temperature detecting means for detecting the temperature of lubricant fed to the sliding surface of the bearing, and wherein said arithmetic means further comprises a third calculating unit for calculating the temperature differentials between the detected temperatures of the bearing surface layer and the detected temperature of the lubricant fed to the sliding surface of the bearing, and a second judging unit for judging the presence or absence of abnormality in the bearing based on the comparison of the calculated temperature differentials with a reference value of temperature set beforehand.

18. A diagnosing apparatus as set forth in claim 14, wherein said means for detecting values representing the conditions of the bearing further comprises sound detecting means mounted on the bearing, and wherein said arithmetic means further comprises a second judging unit for judging abnormality in the bearing based on the comparison of the sound signal generated by the sound detecting means with a reference value of sound set beforehand.

19. An apparatus for diagnosis of a bearing comprising:
means for detecting values representing the conditions of the bearing journalling a rotary shaft, said means for detecting values representing the conditions of the bearing including bearing surface layer temperature detecting means located in the vicinity of the sliding surface of the bearing for detecting the temperature of the bearing surface layer, and fed oil temperature detecting means for detecting the temperature of lubricant fed to the sliding surface of the bearing;

arithmetic means for diagnosing the operating conditions of the bearing based on the values representing the conditions of the bearing detected by said detecting means, said arithmetic means including a first calculating unit calculating the temperature differential between the detected temperature of the bearing surface layer and the detected temperature of the lubricant fed to the sliding surface of the bearing, and a first judging unit for judging abnormality in the bearing based on the comparison of the calculated temperature differential with a reference value of temperature set beforehand.

20. A diagnosing apparatus as set forth in claim 19, wherein said bearing surface layer temperature detecting means are mounted at a plurality of points, and wherein said arithmetic means comprises, in addition to the first calculating unit, a second calculating unit for calculating the temperature differential between the detected bearing surface layer temperatures, and a second judging unit for judging abnormality in the bearing based on the comparison of the bearing surface layer temperature differential calculated by said second calculating unit with a reference value of temperature set beforehand.

21. An apparatus for diagnosis of a bearing comprising:

means for detecting values representing the conditions of the bearing indicative of the behavior of the bearing journalling a rotary shaft, said means for detecting values representing the conditions of the bearing including sound detecting means mounted on the bearing;

arithmetic means for diagnosing the operating conditions of the bearing based on the values representing the conditions of the bearing detected by said detecting means, said arithmetic means comprises a judging unit for judging abnormality in the bearing based on the comparison of the sound signal generated by said sound signal with a reference value of sound set beforehand.

* * * * *